United States Patent [19]

Ritter

[11] Patent Number: 4,501,648
[45] Date of Patent: Feb. 26, 1985

[54] ELECTROPHORETIC PROCESS FOR SEPARATING AQUEOUS MINERAL SUSPENSIONS

[75] Inventor: Robert A. Ritter, Calgary, Canada

[73] Assignee: Alberta Oil Sands Technology and Research Authority, Edmonton, Canada

[21] Appl. No.: 476,820

[22] Filed: Mar. 24, 1983

Related U.S. Application Data

[63] Continuation of Ser. No. 330,162, Dec. 14, 1981, abandoned.

[30] Foreign Application Priority Data

May 26, 1981 [CA] Canada .................................. 378386

[51] Int. Cl.$^3$ .............................................. C02F 1/46
[52] U.S. Cl. ................................ 204/149; 204/180 R; 204/185; 210/748
[58] Field of Search ........... 204/149, 152, 185, 180 R, 204/181 N; 210/748

[56] References Cited

U.S. PATENT DOCUMENTS

| | | | |
|---|---|---|---|
| 541,335 | 6/1895 | Salzburger | 204/149 |
| 3,962,069 | 6/1976 | Inoue et al. | 204/152 |
| 4,367,132 | 1/1983 | Bell et al. | 204/152 |

Primary Examiner—Howard S. Williams
Assistant Examiner—Terryence Chapman
Attorney, Agent, or Firm—Ernest Peter Johnson

[57] ABSTRACT

An aqueous suspension of fine mineral solids, for example oil sand tailings sludge, is separated into separate solid and liquid components by first chemically conditioning the suspension with the addition of lime, and thereafter passing an electrical potential between electrodes submerged in the suspension. The electrical potential causes the solids to migrate toward, and deposit on, the positive of the electrodes. The lime pre-treatment allows the electrode deposit to dry, through electroosmosis, to render it sufficiently dry by disposal. The chemical conditioning step preferably includes adding a carbonate- or bicarbonate-forming reagent after the lime addition.

7 Claims, 3 Drawing Figures

ELECTROPHORETIC PROCESS FOR SEPARATING AQUEOUS MINERAL SUSPENSIONS

This application is a continuation of application Ser. No. 330,162 filed 12-14-81 now abandoned

BACKGROUND OF THE INVENTION

The present invention relates to an electrophoretic process for separating aqueous suspensions of fine mineral solids into solid and liquid components.

One problematic aqueous suspension of fine mineral solids arises as a waste tailings stream from commercial oil sand extraction plants. Two such extraction plants are presently mining and extracting the oil sands of the Athabasca oil sand deposit of Alberta, Canada, this being one of the largest oil sand deposits in the world. The oil sands exist as sand beds partially saturated with viscous bitumen. The bitumen content in the deposits ranges from less than 1% to about 18%. The grains of sand in these deposits are enveloped with a film of hygroscopic water containing fine mineral solids of silt and clay. The bitumen adheres as a film over this water layer. To extract the bitumen from the sands, a process known as the hot water extraction process is used. Briefly, the process includes mixing steam and hot water with the mined oil sands to form a dense pulp, then adding further quantities of hot water and practising flotation to separate the sand from the bitumen. The bitumen is skimmed off as a froth product and further upgraded, while the remainder of the water and solids are rejected as tailings streams. Process aids, including alkali and surfactants are added in the above steps to improve the bitumen separation. The majority of these process aids, together with unrecovered bitumen, are lost with the tailings stream. This tailings is produced at a rate of about 1 U.S. Gal./min. for every 10 Bbl./day of bitumen produced.

The sand solids settle rapidly from this tailings stream and clear water accumulates on the top leaving a stream, termed tailings sludge, which consists of a thixotropic suspension of water, the fine mineral solids released from the sand grains during the extraction process, unrecovered bitumen and lost process aids. The mineral content of this sludge ranges from about 11% to 40% by weight. The tailings sludge formes a relatively stable, non-settling suspension which must be discarded.

Presently, the tailings streams are disposed of in long term settling ponds. The tailings accumulate in these ponds at a rate of about 20,000 acre feet/year for a 100,000 Bbl./day oil sand extraction plant. These settling ponds, which are highly viscous and contaminated with bitumen, pose serious environmental hazards. The ponds also represent a significant loss of valuable process water and chemical process aids, and present a serious obstruction to the future recovery of the underlying bitumen deposits.

A number of different techniques have been proposed to date to cope with the growing problem of tailings disposal. Such techniques include filtration, chemical and biochemical flocculation, and centrifugation. The objective is always the same, to separate the suspended mineral fines from the aqueous phase to create a compact disposable solid product and a clarified, reusable water product. In each instance, however, the energy or chemical costs have been high and drying of the solid mineral phase to a water content of less than 60% has been difficult, if not impossible. It is usually desirable to obtain a solids product of greater than 40% solids and a clarified liquid product of less than 4% solids. These limits, while somewhat arbitrary, tend to define a solids product which is sufficiently dry for disposal, and a liquid product which can be reused as process water in the hot water extraction process.

The problem in obtaining a sufficiently dry deposit arises from the fact that a substantial portion of the sludge water is, through chemisorption, intimately associated with the clay particle structure and is essentially immobilized. The influence of normal mechanical forces does not appear to be able to dislodge this water from the clay.

Electrophoresis and electroosmosis are techniques which have been investigated in separating various types of solids from liquid-solid suspensions. Electrophoresis involves applying an electrical potential between electrodes in a liquid-solid suspension to cause the solids to migrate toward one of the charged electrodes. Electroosmosis, often termed reverse osmosis, involves applying an electrical potential in a liquid medium, particularly water, to cause the liquid to move, usually through a permeable barrier, toward a charged electrode. In aqueous suspensions of fine mineral solids such as clay, electrophoresis causes the mineral solids to migrate toward and deposit on the anode, whereas electroosmosis causes the water to migrate out of the clay deposit.

Various schemes for electrophoretically separating solids from liquid-solid suspensions are disclosed in U.S. Pat. Nos. 3,980,547 and 4,003,811, issued to A. C. Kunkle, 3,962,069 issued to K. Inoue et al., and 4,207,158 issued to M. P. Freeman. While these schemes may be effective in causing solids to deposit on an electrode surface, from my experience, when applied to an aqueous suspension of mineral fines, they would not provide a solids deposit sufficiently reduced in water content, for disposal.

In fact, in a study done by B. C. Flintoff and L. R. Plitt, published in Canadian Metallurgical Quarterly, 15, (1976), pg. 235-242, the conclusion was reached that only a limited degree of clarification could be achieved by electrophoretic separation of such aqueous suspensions of mineral solids as bentonite and oil sand tailings.

SUMMARY OF THE INVENTION

I have discovered that by proper chemical conditioning of an aqueous suspension of fine mineral solids, the suspension can thereafter be successfully separated, by combined electrophoresis and electroosmosis, into a solid product suitable for disposal and a clarified liquid product. In the case of oil sand tailing sludge, the clarified liquid has been found to be suitable for reuse in the conventional hot water extraction process.

In accordance with the present invention, the aqueous suspension of fine mineral solids is conditioned by adding lime to the suspension. An electrical potential is then applied between electrodes, at least partially submerged in the conditioned suspension, to cause the mineral solids to migrate toward and deposit on the positively charged electrode. The applied electrical potential also dries the solid deposit on the electrode, through electroosmosis, to render it sufficiently dry for disposal. The solids deposit is removed from the electrode as a solids product, while the liquid component of the suspension, reduced in solids content, is recovered as a clarified liquid product.

In a preferred aspect of the process of the present invention the lime addition is followed by the addition of a reagent which will form carbonate or bicarbonate in solution. Preferred carbonate- or bicarbonate-forming reagents include one or more of carbon dioxide, ammonium carbonate, and ammonium bicarbonate. The carbonate- or bicarbonate-forming reagent is preferably included in an amount sufficient to adjust the pH of the suspension in the range of about 8.4 to 11 units, and most preferably in the range of about 9 to 10.5 units.

The chemical conditioning scheme of the present invention was arrived at only after extensive testing of electrophoretic schemes, both with and without pre-treatment chemicals. In the absence of any pre-treatment chemical, electrophoresis of the oil sand tailings sludge would indeed cause the fine solids to deposit on the anode, however, the deposit was invariably too wet for satisfactory disposal. Further, the clarified liquid, while reduced in solids content, could not usually be clarified below about a 5% solids content. A large number of pre-treatment chemicals were tested before arriving at the combination of lime followed by a carbonate- and bicarbonate-forming reagent.

While not wishing to be bound by the same, I have postulated a mechanism for the process of this invention. The clay component of the oil sand tailings is usually predominantly of the sodium form of illite and kaolinite. In the sodium form, the illite clay can swell through the occlusion and chemisorption of water, due at least in part to the high net negative charge on the clay particle. Initially the oil sand tailings sludge includes sodium bicarbonate, both in solution and on the surface of the clay particles. Upon addition of lime to the sludge, the bicarbonate is converted to carbonate in accordance with the reaction:

$$2NaHCO_3 + Ca(OH)_2 \rightarrow Na_2CO_3 + 2H_2O$$

A residual of hydroxide, depending on the quantity of lime added, remains in solution. The above scheme appears to be one of chemisorption rather than ion exchange, since analysis of the aqueous phase at this stage shows very little sodium to be displaced. The addition of the carbonate- or bicarbonate-forming reagent, in the preferred form of the process, is believed to convert a portion of the remaining hydroxide, both in solution and on the clay, to the carbonate form in accordance with the overall reaction:

$$Ca(OH)_2 + 2NaOH + 2CO_2 \rightarrow CaCO_3 + Na_2CO_3 + 2H_2O.$$

Electrophoresis, at this point, causes the still negatively charged particles to deposit on the anode, neutralizing charges. The clay particles agglomerate and sodium hydroxide and water are expelled from the anode deposit by electroosmosis. The sodium hydroxide upon release into the aqueous phase is neutralized through reaction with bicarbonate:

$$NaOH + NaHCO_3 \rightleftharpoons Na_2CO_3 + H_2O.$$

The insoluble calcium carbonate remains in place on the clay surface, the illite is altered to its non-swelling calcium form, and the anode deposit is consolidated into a dense and rigid state.

In a further preferred aspect of the process, an additional quantity of the carbonate- or bicarbonate-forming reagent is added to the suspension after applying the electrical potential, should the rate of solids deposition on the anode significantly diminish. The electrical potential can then be reapplied to continue the deposition and clarification processes. The diminished rate of deposition is accompanied by an increase in pH, which is believed to be due to the hydroxide ejected from the deposit having consumed all of the available bicarbonate. This problem creates a chemical potential which balances and thereby negates the applied electrical potential. The addition of the carbonate- or bicarbonate-forming reagent is believed to neutralize the effect of the sodium hydroxide.

In yet another preferred aspect of the invention the process is practised in an electrophoretic cell, having disposed therein, at least partially submerged, a positively charged endless anode belt and a negatively charged cathode. The anode is inclined in the cell such that it can be rotated through and out of the suspension in the cell. The cathode is spaced above the portion of the surface of the anode belt which is submerged in the slurry. This preferred anode-cathode configuration facilitates removal of the solids deposit from the anode, as the deposit is removed as the belt moves out of the suspension. This configuration also allows for continuous operation of the process of the present invention.

Broadly stated, the invention is a process for separating an aqueous suspension of fine mineral solids into a solids product and a clarified liquid product, comprising: chemically treating the suspension by adding lime in an amount between 0.5 and 3.5 g/l of suspension; adding to the suspension a reagent, selected from the group consisting of carbon dioxide, ammonium carbonate, ammonium bicarbonate and mixtures thereof, in an amount sufficient to maintain the pH of the suspension during electrical treatment in the range of about 8.4 to 11 units; moving an anode electrode into, through and out of the suspension in spaced, generally parallel relation to a cathode electrode submerged in the suspension; applying sufficient electrical potential between the electrodes and retaining the anode electrode for at least sufficient time in the suspension to cause the solids to migrate to and deposit on the anode electrode and to dry thereon to a solids content greater than about 40% by weight; removing from the suspension that portion of the anode electrode which has been in the suspension at least the required minimum time, together with the solids associated therewith, and recovering the solids therefrom; and recovering clarified liquid product, containing less than about 4% by wt. solids.

DESCRIPTION OF THE PREFERRED EMBODIMENT

Figure 1:
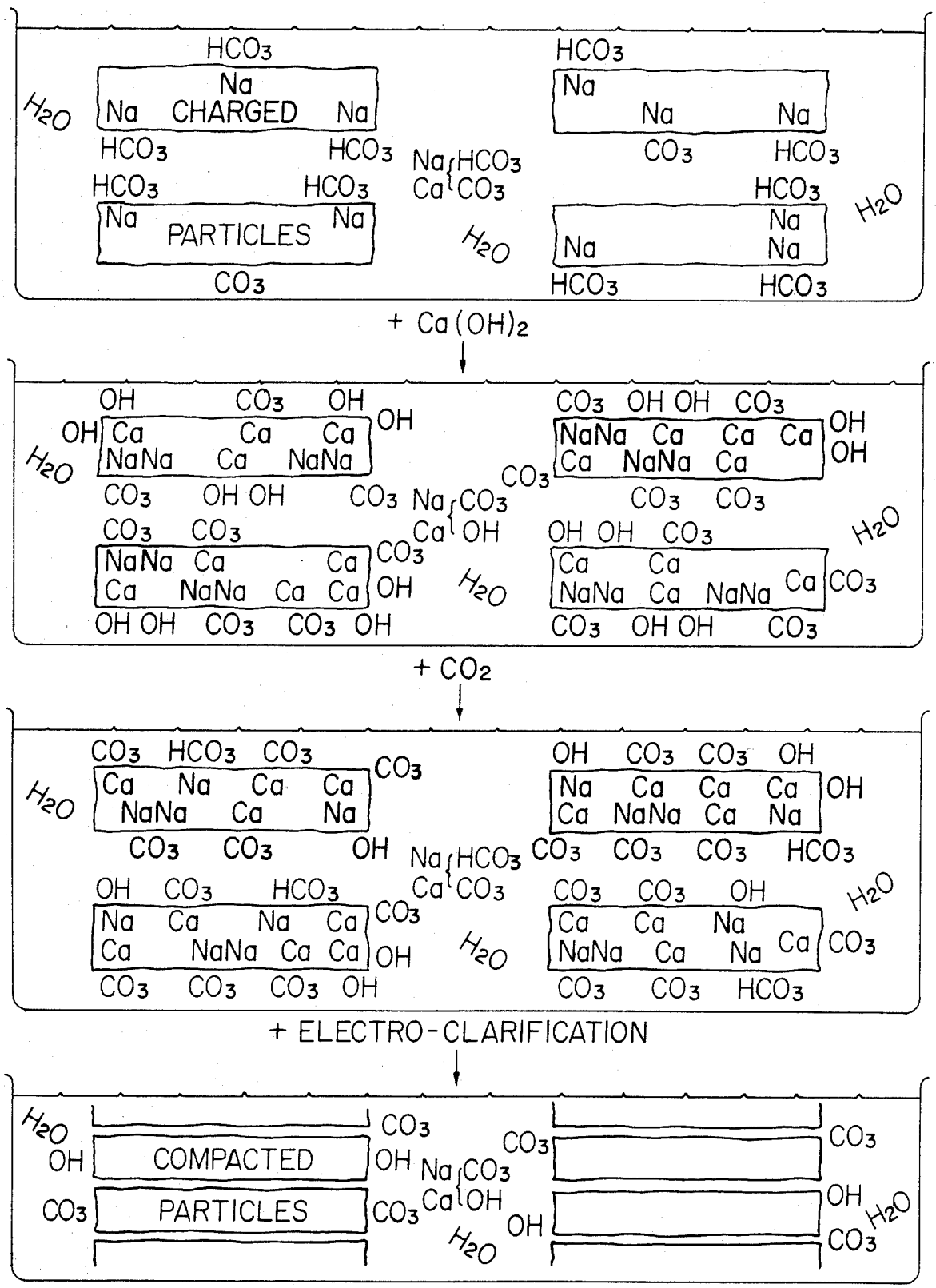
FIG. 1 is a schematic flowsheet showing the chemical mechanism postulated to explain the electrophoretic process of the present invention.

While the process of the present invention will be described with respect to separating oil sand tailings sludge, it should be understood that the process can also be extended to separating other aqueous suspensions of fine mineral solids. By 'fine mineral solids' is meant particles in the clay and silt size range which will normally acquire a negative charge in an aqueous suspension and therefore be caused to migrate toward a positively charged electrode.

The process of the present invention is preferably practised on only the sludge portion of the oil sand tailings stream from the hot water extraction process. The sludge portion, as previously stated, has the majority of the sand particles separated therefrom. While the sand particles themselves have not been found to be detrimental to the present process, it is believed that there would be no advantage to treating them simultaneously with the sludge. The sand particles readily gravity settle from the tailings stream with no pre-treatment. Therefore it is believed to be most economical to treat only the sludge portion of the tailings stream to minimize the quantity of material to be processed.

In accordance with the present process, the tailings sludge is chemically conditioned prior to applying an electrical potential in the sludge, to cause the solids in the sludge, which migrate toward and deposit on the positively charged electrode, to form a disposable solids deposit. The type and amount of chemical conditioning needed to form such a deposit will vary with the properties of the sludge to be treated. As previously explained, the conditioning step is believed to work by forming carbonate on the clay surface. This carbonate formation is believed to enable the clay, once deposited, to be dried through the process of electroosmosis. With all sludge types, lime is added to the sludge, preferably in the form of $Ca(OH)_2$, but alternatively in the form of CaO. The amount of lime added will vary with the solids content of the suspension; in most cases an amount in the range of about 0.75 to 2.5 g/l is preferred. With some sludges, this lime pre-treatment alone has been found to enable the components of sludge to be thereafter separated by electrophoresis. Such sludges are believed to contain considerable amounts of bicarbonate on the untreated clay particles, which bicarbonate forms carbonate upon lime addition and enables the clay to be dried on the electrode surface.

With the majority of tailings sludges, however, it is desirable to further treat the sludge with a reagent which will provide additional carbonate or bicarbonate in solution. Preferred carbonate- or bicarbonate-forming reagents include one or more of carbon dioxide, ammonium carbonate and ammonium bicarbonate. Calcium carbonate itself has been tested as a carbonate source, and in some instances has been found to modestly improve the solids deposit attainable. This is presumably due to the low solubility of the calcium carbonate.

The amount of the carbonate or bicarbonate reagent added is preferably sufficient to adjust the pH of the sludge in the range of about 8.4 to 11 units. The most preferable pH range has been found to be about 9.0 to 10.5. This latter range has been found to yield the driest solids deposits upon applying the electrical potential. Outside the pH 8.4 to 11 range the solids deposit tends to be wetter.

The above scheme of chemical conditioning is shown schematically in FIG. 1. The figure illustrates the chemical mechanism previously disclosed.

Figure 2:
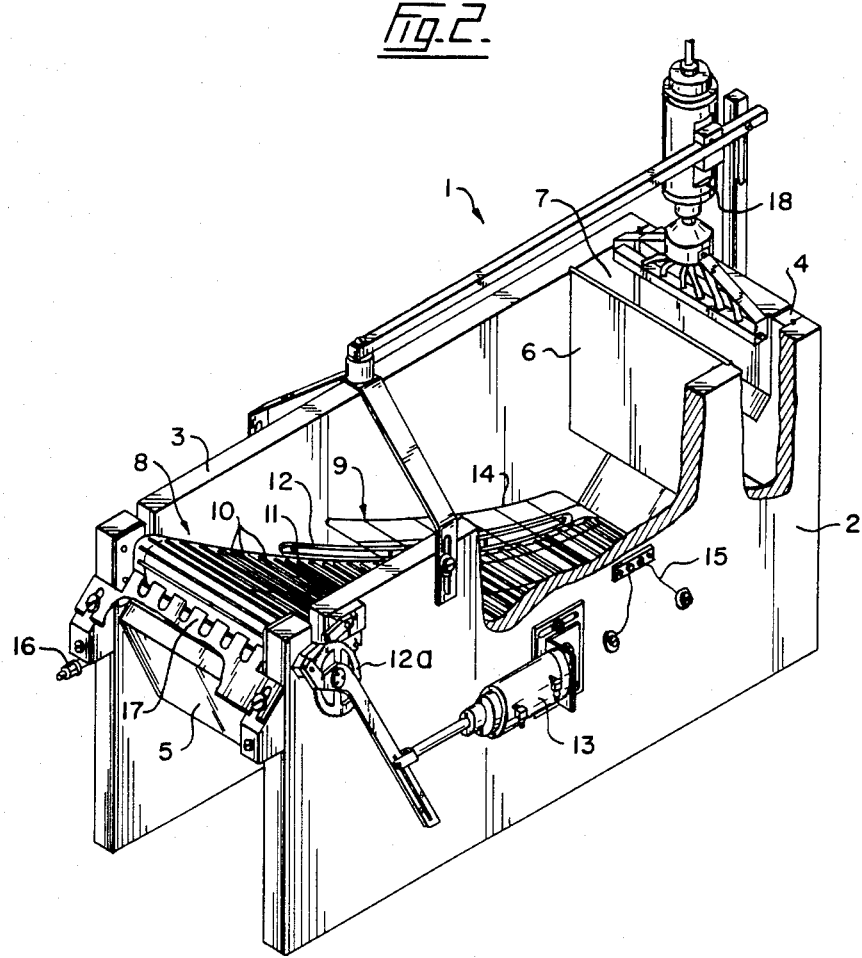
FIG. 2 is a perspective view of the electrophoretic cell utilized in the process of the present invention.

Following this chemical pre-conditioning, the sludge is introduced into an electrophoretic cell equipped with a pair of electrodes. An embodiment of an electrophoretic cell is shown in FIG. 2. The cell 1 includes oppositely spaced side walls 2, 3, closed at one end by an end wall 4. The floor 5 of the cell 1 is inclined at about a 45 degree angle, extending upwardly from the end wall 4, as shown. Spaced from the end wall 4 is an inlet baffle 6. The cell space between the baffle 6 and the end wall 4 provides a feed well 7 for introduction of the sludge.

An anode 8 and a cathode 9 are provided in the cell 1. The anode 8 comprises a plurality of conductive rods 10 fastened to the upward facing surface of an endless flexible anode belt 11. The belt 11 is inclined at about a 45 degree angle following the floor 5. The belt is rotatable on a pair of upper and lower rollers (not shown). The belt 11 extends across the entire width of the cell 1 and along the majority of the cell length to minimize the amount of solids which can accumulate in the dead space below the belt. The upper surface of the belt 11 rides in belt guides 12 fastened to side walls 2, 3. The belt is driven through a sprocket 12a fixed to the upper roller. The sprocket 12a is driven by a variable speed drive system 13, to move the belt through and out of the suspension.

To provide electrical contact for the anode belt, each end of each of the rods 10 is interconnected by a conductive wire (not shown) extending the entire length of the belt. This wire extends through the belt itself and is looped through a hole (not shown) in the end of each rod 10. This wire, by extending through the belt itself, is constantly in contact with the upper roller. The roller is connected to the positive rail of a power source (not shown) to simultaneously and uniformly energize each of the anode rods 10.

The side edges of the anode rods 10 are hidden from the cathode 8 by a plastic hem (not shown) fastened along the side edge of the upward facing surface of the belt 11. This provision prevents the solids from depositing along the side edges of the belt 11 to thereby eliminate friction between the anode deposit and the side walls 2,3.

The anode rods are made of a corrosion resistant conductive material such as Alonized steel (trade mark of Alcon Co.), platinum or lead, or of a corrodible material such as mild steel, which demonstrates a superior performance.

The cathode 9 comprises an open grid 14, following the incline of the belt 11, and spaced a short distance above that portion of the anode belt which is submerged in the sludge. The cathode itself is also positioned such that it is submerged in the sludge. The open structure of the cathode grid allows the solids to settle both by gravity and electrophoresis through the cathode toward the anode. The cathode 9 need not be as corrosive resistant as the anode rods 10, since it is electrically protected against corrosion. Copper, aluminum and steel are acceptable cathode materials. The cathode is connected, by wires 15, through the side wall 2 to the negative rail of the power supply.

The anode belt 11 and cathode grid 14 are preferably spaced by a distance greater than 1" and most preferably by a distance in the range of about 2" to 3". With electrode spacings of 1" or less, gas evolution at the anode has been found to damage the anode deposit.

An outlet 16 extends into the cell 1 just below the expected height of the sludge in the cell to remove clarified liquid from the cell.

A scraper 17 is provided against the anode belt 11 adjust the upper roller to contact the anode deposit just after the belt 11 rounds the upper roller. The scraper functions to dislodge any deposit adhering to the belt surface. In most cases however, the deposit is sufficiently dry to fall freely from the belt surface without the aid of the scraper 17.

The conditioned sludge is introduced in the feed well 7, through a variable flow feed pump 18 is positioned thereabove. The sludge is added to a level covering the cathode 9. While the above-described cell is designed for continuous operation, an initial start up time is required before an anode deposit and a clarified liquid can be generated. Thus, after applying the electrical potential between the electrodes 8, 9 the feed pump 18 and the belt drive 13 are delayed, usually for several hours. The preferred range of voltage applied between the electrodes is 6 to 15 volts, and more preferably about 10 volts. At less than about 6 volts the rate of deposition has been found to be undesirably slow. At voltages greater than about 15 volts, gas evolution at the anode interferes with the anode deposition process.

Once a substantial solids deposit has accumulated on the anode belt 11, the belt is moved slowly and continuously through the sludge and up out of the sludge. The feed pump 18 is restarted and the sludge is fed continuously at a slow rate into the feed well 7. The feed well acts to direct the added sludge downwardly toward the base of the anode belt 11, and prevents outward dilution of the untreated sludge into the clarified liquid above the belt. Clarified liquid is continuously recovered through the outlet 16 while the solids deposit is continuously removed from the anode belt above the surface of the sludge.

The anode belt speed and the sludge feed rate are independently adjusted to give the desired solids content in the anode deposit and clarified liquid product. It is desirable to obtain an anode deposit containing greater than 40% wt. solids, and a clarified liquid product containing less than 4% wt. solids. The belt speed and slurry feed rate will of course vary with such factors as the solids content in the original sludge, and the type and amount of pre-treatment chemicals added to the slurry. All of these parameters can be set by simple experimentation at the beginning of the process.

Should the rate of solids deposition fall off significantly before the desired solids and liquid products be attained, an additional amount of the carbonate- or bicarbonate-forming reagent is added to the cell. This reduction in the deposition rate often occurs when concentrated sludges, high in solids content, are being treated. The pH of the sludge can rise, if not controlled, to values in excess of pH 13. An amount of the carbonate- or bicarbonate-forming reagent sufficient to lower the sludge pH to less than about 11 units, is preferably added. The electrical potential is then continued until the desired solids and clarified liquid products are obtained.

The process of the present invention is further illustrated in the following examples.

EXAMPLE 1

A large number of pre-treatment chemicals were tested before arriving at the chemical conditioning steps of the present invention. The operability of a given pre-treatment chemical was tested in a small batch-type electrophoretic cell. The cell was cylindrical in shape and included a centrally located anode rod and a cylindrically shaped cathode cage. The anode was constructed of lead, while the cathode was constructed of copper. A cathode-anode spacing of about 2.5″ was used.

In each run, one or more selected pre-treatment chemical was blended with a sample of oil sand tailings sludge. Concentrations of the pre-treatment chemical varied from 100 to 700 ppm. The pH of the sludge was then measured and the sludge was introduced in the electrophoretic cell. A voltage of about 10 V was applied between the electrodes and continued for the desired initial processing time, typically about 1 hour. The power source was then disconnected, the anode was removed and the accumulated solids deposited thereon measured by weighing. The pH of the sludge was remeasured. Any desired pH adjustment or pre-treatment chemical modification, indicated in the Tables to follow as "Chemicals Added During Electrophoresis", was made. The electrode potential was then reapplied. At the end of a run the anode deposit was removed and assessed for moisture content by oven drying (O.D.) at 110° C., and for mineral content by furnace ignition (F.D.) at 550° C. The liquid residue was assessed for moisture or mineral content in the same manner.

The types of oil sand tailings sludges treated included secondary tailings streams produced by the Syncrude Pilot Plant in Edmonton, Alberta, and the Syncrude Plant at Fort McMurray, Alberta, and a sample of the tailings sludge from the long term settling pond at the Suncor plant at Fort McMurray, Alberta. The first sample had an initial pH of 9.3 and a solids content of approximately 10% (O.D.). Settling of this sample for 48 hours reduced the solids content in the supernatant to 4.5%. The Syncrude Plant sample had an initial pH of 9.3 and a solids content of about 15%. Settling for 48 hours produced a supernatant having about 10% (O.D.) solids. The latter sample had an initial pH of 7.3 and a solids content of 22% (O.D.). Settling had virtually no effect on the solids content.

Among the pre-treatment chemicals found to give unsatisfactory results in this process, that is insufficient clarification or anode deposition and drying, are the following:

a. $NH_4Cl + NH_4OH$,
b. $FeCl_3 + NH_4OH$,
c. $HCl$,
d. $Na_2SO_4 + NH_4OH$,
e. $CaSO_4 + NaOH + /or\ NH_4OH$,
f. $Fe_2(SO_4)_3(Hyd) + NH_4OH$,
g. $(NH_4)_2SO_4 + NH_4OH$,
h. $Al_2(SO_4)_3(Hyd) + Ca(OH)_2 + /or\ NH_4OH$,
i. $Ca(H_2PO_4)_2(Hyd) + Ca(OH)_2 + /or\ NH_4OH$,
j. $Ca_2HPO_4 + NH_4OH$,
k. $NH_4H_2PO_4 + Ca(OH)_2 + /or\ NH_4OH$,
l. $Ca(OAc) + NH_4OH$,
m. $Al(NO_3)_3(Hyd) + NH_4OH + /or\ Ca(OH)_2$,
n. $Fe_2(C_2O_4)_3(Hyd) + Ca(OH)_2 + NH_4OH$,
o. $H_2C_2O_4(Hyd)$,
p. $NaClO_3$,
q. $Ba(OH)_2 + Ca(OH)_2 + /or\ NH_4OH$,
r. $(NH_4)_2Cr_2O_7 + NH_4OH$,
s. $H_2SO_4$.

Tables 1, 2 and 3 are included to illustrate and contrast some of the more encouraging chemical conditioning schemes. In addition to noting the solids quantities in the solid deposit and clarified liquid products, a parameter identified as the "Reduced Performance Function" (RPF) is presented. The parameter is defined as:

$$RPF = \frac{(c)(P)}{(d)(f)},$$

where
c = % solids in the clarified water
p = Energy consumed in Kw-hr/1000 U.S. gal.
d = % solids in the deposit
f = % solids in the feed sludge.
A low RPF is the desired objective.

In Table 1, it will be noted that the process of the invention does not function simply through altering the pH of the slurry with any type of alkali. Hydroxides of ammonium, sodium, and barium gave significantly poorer results than calcium hydroxide. It will also be noted that, in Table 1, the calcium hydroxide was accompanied by either calcium carbonate or ammonium hydroxide. While these two additives have not been found to be detrimental to the present process, the benefits offered to the process were usually minimal. Occasionally, some beneficial effects were obtained with the calcium carbonate.

In Table 2 it is significant to note that chemical conditioning with ammonium carbonate alone gave an inoperative process as the anode deposit obtained was very wet. Further, while chemical conditioning with lime alone gave an anode deposit of about 40% solids (O.D.), the deposit, together with the clarified liquid product, was significantly improved with the addition of either ammonium carbonate or ammonium bicarbonate both before and during electrophoresis. Here again, many of the runs in Table 2 include calcium carbonate or ammonium hydroxide. Neither chemical had an significant effect on the process results and therefore can be ignored.

Turning to Table 3, the results presented show that carbon dioxide is an acceptable alternative to ammonium carbonate and ammonium bicarbonate. With concentrated slurries however it appears to be advantageous to use ammonium bicarbonate rather than carbon dioxide. The latter, unlike the bicarbonate, does not generate a buffered solution when neutralizing the hydroxide. Consequently very large doses of the carbon dioxide are needed to keep the pH from rising uncontrollably, thereby stopping the deposition process.

TABLE 1

| | EFFECTS OF ALKALIS ON CELL PERFORMANCE | | | | |
|---|---|---|---|---|---|
| Test No. | AG42 | 156 | 202 | 1A | SP51 |
| Chemical Added Prior to Electrophoresis | $Ca(OH)_2$ $CaCO_3$ | $Ca(OH)_2$ $NH_4OH$ | $NH_4OH$ | NaOH | $Ba(OH)_2$ |
| Slurry Mineral Content % (O.D.) | 24.26 | 16.67 | 15.96 | 21.66 | MATERIAL TOO WET - TEST DISCONTINUED |
| Compact Solids Mineral Content % (O.C.) | 50.2 | 40.05 | 37.51 | 46 | |
| Clarified Water Mineral Content % (O.D.) | 3.72 | 4.03 | 3.25 | 6.38 | |
| Processing Time Mins. | 240 | 120 | 150 | 420 | |
| Power Consumption Kw-hr/1000 gal | 93 | 67 | 90 | 177 | |
| Reduced Performance Function | 0.284 | 0.4 | 0.49 | 1.13 | |

TABLE 2

| | EFFECTS OF $(NH_4)_2CO_3$ and $NH_4HCO_3$ ON CELL PERFORMANCE | | | | | | | |
|---|---|---|---|---|---|---|---|---|
| Test No. | 200 | 196 | E5 | SP31 | SP177 | AG63 | AG41 | AG45 |
| Chemicals Added Before Electrophoresis and Amount/700 cc | $(NH_4)_2CO_3$ 10 cc | $Ca(OH)_2$ .5 gm $(NH_4)_2CO_3$ 10 cc $NH_4OH$ 10 cc | $Ca(OH)_2$ 0.75 gm $NH_4HCO_3$ 5 cc $CaCO_3$ 1 gm | $Ca(OH)_2$ .5 gms | $Ca(OH)_2$ .5 gm $NH_4OH$ 20 cc | $Ca(OH)_2$ .5 gm $CaCO_3$ .5 gm | $Ca(OH)_2$ .75 gm $CaCO_3$ .5 gm | $Ca(OH)_2$ .75 gm $CaCO_3$ .5 gm |
| Chemical Added During Electrophoresis and Amount | Nil | $(NH_4)_2CO_3$ 38 cc | $NH_4HCO_3$ 8 cc | Nil | $(NH_4)_2CO_3$ 34 cc | $NH_4HCO_3$ 21 cc | $NH_4HCO_3$ 8 cc | $NH_4HCO_3$ 6 cc |
| Slurry Mineral Content % (O.D.) | MATERIAL TOO WET - TEST DISCONTINUED | 16.3 | 20.95 | 20.49 | 16.6 | 22.34 | 16.92 | 13.1 |
| Compact Solids Mineral Content % (O.D.) | | 40.2 | 47.25 | 39.93 | 44.1 | 50.73 | 46.76 | 51.8 |
| Clarified Water Mineral Content % (O.D.) | | 2.49 | 2.92 | 8.2 | 2.78 | 3.9 | 2.42 | 3.12 |
| Processing Time Mins. | | 150 | 130 | 120 | 90 | 240 | 180 | 180 |
| Power Consumption Kw-hr/1000 gal | | 102 | 147 | 106 | 100 | 85 | 89 | 70 |
| Reduced Performance | | 0.39 | 0.43 | 0.701 | 0.38 | 0.39 | 0.27 | 0.32 |

TABLE 2-continued

| | EFFECTS OF (NH4)2CO3 and NH4HCO3 ON CELL PERFORMANCE | | | | | | | |
|---|---|---|---|---|---|---|---|---|
| Test No. | 200 | 196 | E5 | SP31 | SP177 | AG63 | AG41 | AG45 |
| Function | | | | | | | | |

TABLE 3

EFFECT OF $CO_2$ ON CELL PERFORMANCE

| Test No. | DS25 | DS17 | DS30 | AG22 |
|---|---|---|---|---|
| Chemicals Added Before Electrophoresis and Amount/700 cc | $Ca(OH)_2$ 10 gms $CO_2$ bubbled through | $Ca(OH)_2$ .5 gms $CaCO_3$ .5 gms $NH_4OH$ 4 cc | $Ca(OH)_2$ 1 gm | $Ca(OH)_2$ .5 gms $CaCO_3$ .5 gms |
| Chemical Added During Electrophoresis and Amount/700 cc | $CO_2$ bubbled through | $NH_4HCO_3$ 6 cc | $CO_2$ bubbled through | $NH_4HCO_3$ 41 cc |
| Slurry Mineral Content % (F.D.) | 7.54 | 8.05 | 19.8 | 19.28 |
| Compact Solids Mineral Content % (F.D.) | 39.41 | 35.03 | 47.8 | 41.52 |
| Clarified Water Mineral Content % (F.D.) | 2.07 | 2.21 | 8.58 | 3.47 |
| Processing Time Mins. | 180 | 240 | 240 | 480 |
| Power Consumption Kw-hr/1000 gal | 36 | 26 | 32 | 70 |
| Reduced Performance Function | 0.025 | 0.204 | 0.29 | 0.303 |

EXAMPLE 2

Figure 3:
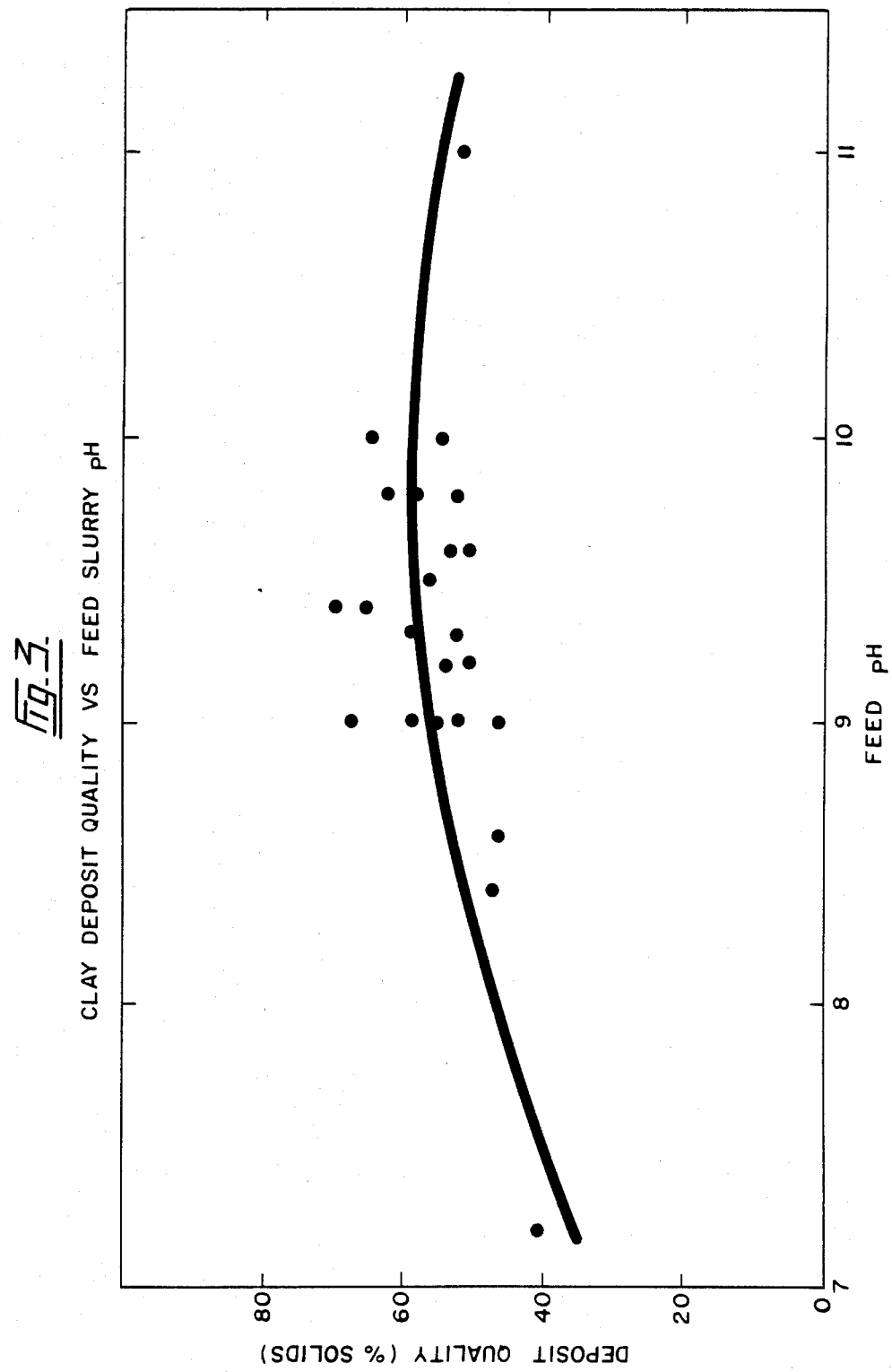
FIG. 3 is a plot of the percent solids content obtained in the solids deposit by the electrophoretic process as a function of the pH of the chemically conditioned feedstock.

The electrophoretic cell, shown in FIG. 2 was operated on a continuous basis with a number of oil sand tailings sludges varying in initial pH. The feeds were conditioned, in accordance with the process of the present invention, by adding 2.5 g/l of lime to the sludge and thereafter adding a sufficient quantity of carbon dioxide to obtain a pH in the range of about 7 to 11. This initial pH was measured. The conditioned sludge was then introduced in to the electrophoretic cell 1 and treated in the manner previously explained, with a voltage of 10 V applied over 4 hours. The percent solids (O.D.) accumulated in the anode deposit is plotted as a function of the initial feed pH in FIG. 3. The optimum pH range is shown to be in the range of about 9 to 10.5 units for maximum dryness of the deposited solids.

It will also be noted, that by operating the process in this continuous electrophoretic cell, under these optimum conditions, a solids deposit having a mineral content in excess of 60% was attainable.

Further, although not shown in the attached Figure, this continuous process, when optimized as above, yielded a clarified liquid product having less than 3% solids. Analysis of this clarified product is shown in Table 4. This analysis is compared, in the Table, with the relatively clear supernatant tailings water sampled from the tailings pond at the Suncor plant. This observation is significant since this Suncor tailings water is skimmed from their tailings pond and used as process water in their commercial hot water extraction process. The liquid product of the present process compares favourably with the Suncor tailings water.

The above-described clarified liquid product was tested, on a bench scale basis to determine whether the water was usable as process water in the hot water extraction process. These tests showed that the yield of bitumen obtained with the use of this liquid product did not vary significantly from the yield of bitumen obtained with the use of potable water. This represents an important feature of the present process, as it shows that the liquid product is suitable for reuse in the hot water extraction process.

While the present invention has been disclosed in connection with the preferred embodiment thereof, it should be under stood that there may be other embodiments which fall within the spirit and scope of the invention as defined by the following claims.

TABLE 4

COMPARISON OF CLARIFIED LIQUID TO SUNCOR TAILINGS WATER

| | Clarified Liquid | SUNCOR[1], [2] |
|---|---|---|
| pH | 9.99 | 8.4–9.3 |
| Conductivity | 1.50 mmho/cm | — |
| % Suspended Solids freshly mixed | 1.68% | 1.1%–1.7% |
| After five days of settling | 1.42% | |
| Ion content (ppm) | | |
| Al | 7.0 | — |
| Ca | 1.7 | 15 |
| Fe | 1.5 | 0.5–2.8 |
| K | 7.7 | — |
| Na | 340 | — |
| Si | 6 | — |
| Cl | 37 | 86 |
| Br | <1 | — |
| $SO_4$ | 146 | 42 |

— data not available
[1] Camp, F. W.; Processing Athabasca Tar Sands - Tailings Disposal Canadian Chemical Engineering Conference, Oct. 6, 1976.
[2] Jantzie, T. D.; Project AF 3.1.2., Alberta Oil Sands Environmental Research Program, August, 1977.

The embodiments of the invention in which an exclusive privilege is claimed are defined as follows:

1. A process for separating an aqueous suspension of fine mineral solids into a solids product and a clarified liquid product, comprising:
   chemically treating the suspension by adding lime in an amount between 0.5 and 3.5 g/l of suspension;
   adding to the suspension a reagent, selected from the group consisting of carbon dioxide, ammonium carbonate, ammonium bicarbonate and mixtures thereof, in an amount sufficient to maintain the pH of the suspension during electrical treatment in the range of about 8.4 to 11 units;
   moving an anode electrode into, through and out of the suspension in spaced, generally parallel relation to a cathode electrode submerged in the suspension;
   applying sufficient electrical potential between the electrodes and retaining the anode electrode for at least sufficient time in the suspension to cause the solids to migrate to and deposit on the anode electrode and to dry thereon to a solids content greater than about 40% by weight;
   removing from the suspension that portion of the anode electrode which has been in the suspension at least the required minimum time, together with the solids associated therewith, and recovering the solids therefrom;

and recovering clarified liquid product, containing less than about 4% by wt. solids.

2. The process as set forth in claim 1 wherein:
the lime is added in an amount in the range of about 0.75 to 2.5 g/l of suspension.

3. The process as set forth in claim 2 wherein:
the electrodes are spaced apart at least 2 inches and the voltage applied is in the range of about 6 to 15 volts.

4. The process as set forth in claim 1 wherein:
the retention time is sufficient to result in the solids content of the deposit on the anode electrode being greater than 60% by weight.

5. The process as set forth in claim 3 wherein:
the retention time is sufficient to result in the solids content of the deposit on the anode electrode being greater than 60% by weight.

6. The process as set forth in claim 4 wherein:
the suspension is the sludge in the tailings from a tar sands hot water extraction process.

7. The process as set forth in claim 5 wherein:
the suspension is the sludge in the tailings from a tar sands hot water extraction process.

* * * * *